(12) United States Patent
Shimizu

(10) Patent No.: US 8,670,338 B2
(45) Date of Patent: Mar. 11, 2014

(54) RADIO COMMUNICATION DEVICE AND METHOD OF CONTROLLING RADIO COMMUNICATION DEVICE

(75) Inventor: Masahiko Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 652 days.

(21) Appl. No.: 12/948,728

(22) Filed: Nov. 17, 2010

(65) Prior Publication Data

US 2011/0116404 A1 May 19, 2011

(30) Foreign Application Priority Data

Nov. 18, 2009 (JP) ................................. 2009-262672

(51) Int. Cl.
*H04J 3/14* (2006.01)

(52) U.S. Cl.
USPC .................. 370/252; 370/279; 370/293

(58) Field of Classification Search
None
See application file for complete search history.

(56) References Cited

U.S. PATENT DOCUMENTS

2009/0149144 A1\* 6/2009 Luz et al. ...................... 455/216

FOREIGN PATENT DOCUMENTS

| EP | 1024551 A2 \* | 1/1999 | ............... H01Q 1/52 |
|---|---|---|---|
| EP | 1024551 A2 | 8/2000 | |
| JP | 9-312587 A | 12/1997 | |
| JP | 2004-254111 A | 9/2004 | |
| JP | 2007-124581 A | 5/2007 | |
| JP | 2007-243455 A | 9/2007 | |
| JP | 2009-506685 A | 2/2009 | |
| WO | WO-01/71846 A1 | 9/2001 | |
| WO | WO-2007-025309 A1 | 3/2007 | |

OTHER PUBLICATIONS

Blanch, S. et al., "Exact representation of antenna system diversity performance from input parameter description", Electronics Letters, May 1, 2003, vol. 39 No. 9 May 1, 2003, pp. 705-707.
Extended European Search Report dated Feb. 23, 2011 for corresponding European Application No. 10191219.4.
Japanese Office Action mailed Jul. 16, 2013 for corresponding Japanese Application No. 2009-262672, with Partial English-language Translation.

\* cited by examiner

*Primary Examiner* — Andrew Lai
*Assistant Examiner* — Leon Andrews
(74) *Attorney, Agent, or Firm* — Fujitsu Patent Center

(57) ABSTRACT

A radio communication device for executing a communication on the basis of a frequency division duplex, has a first antenna, a second antenna, a first receiver for receiving a first radio frequency signal via the first antenna, a second receiver for receiving the first radio frequency signal via the second antenna, a transmitter for transmitting a second radio frequency signal via the second antenna, a power measuring unit for measuring a first power of a component of the second radio frequency signal in a received signal received via the first antenna, and a control unit for controlling a reactance between the first antenna and the second antenna so as to lower an amount of coupling between the first antenna and the second antenna on the basis of the measured first power.

16 Claims, 10 Drawing Sheets

RADIO COMMUNICATION DEVICE AND METHOD OF CONTROLLING RADIO COMMUNICATION DEVICE

CROSS-REFERENCE TO RELATED APPLICATION

This application is based upon and claims the benefit of priority of the prior Japanese Patent Application No. 2009-262672, filed on Nov. 18, 2009, the entire contents of which are incorporated herein by reference.

FIELD

The present art relates to a radio communication device and method of controlling the radio communication device.

BACKGROUND

E-UTRA (Evolved Universal Terrestrial Radio Access) (also called LTE (Long Term Evolution) which is a next-generation mobile unit communication standard is established, supposing that a mobile terminal has a plurality of antennas in order to implement MIMO (Multi Input Multi Output). However, as the size of a mobile terminal is reduced, a distance between antennas is extremely reduced in a mobile terminal with a plurality of antennas accordingly. As a result, harmful effects may be caused by a reduction in distance between antennas.

For example, it is assumed that a mobile terminal serving as a radio communication device has two antennas (for example, a first antenna and a second antenna). In the above mentioned case, such a first harmful effect may occur that when a radio wave is to be transmitted via the first antenna, the impedance of a transmission system of the first antenna is made mismatching under the influence of the second antenna and the quantity of reflection components is increased in the first antenna. In addition, such a second harmful effect may occur that part of a signal which has been transmitted via the first antenna is absorbed into (received by) the mobile terminal via the second antenna. Incidentally, a phenomenon that a signal which has been transmitted via a first antenna is absorbed into a mobile terminal via a second antenna is called "coupling" and the quantity of signals which are absorbed via the second antenna is called a "coupling amount". In the case that a radio wave which has been radiated via the first antenna is absorbed into the mobile terminal via the second antenna or a high-frequency signal is propagated across a substrate of the mobile terminal from the first antenna toward the second antenna, the coupling occurs between the antennas. An inter-antenna coupling amount (an amount of coupling between antennas) tends to be increased with decreasing a distance between antennas.

In the case that the inter-antenna coupling amount is large, such a problem may generate that a desired transmit signal level (in other words, a substantial transmit signal level) is not obtained and hence throughput of communication with a communication device (for example, a base station) as a transmit destination is reduced. If such countermeasures as to increase the amplification degree of an amplifier of a transmission system so as to ensure a desired transmit signal level is taken in order to eliminate the above-mentioned problem, such another problem will generate that the power consumption becomes higher than that used when the inter-antenna coupling amount is small.

In addition, in the case that signals are received via two antennas and transmitted via one of them, when the inter-antenna coupling amount is large, such a problem may generate that the sensitivity to receive a desired wave is relatively reduced.

Nowadays, a radio device (a radio communication device) configured such that a variable coupler is disposed between two antennas so as to cope with coupling which would occur between the antennas thereby to control the coupling amount of the variable coupler using an integrated control device such that the coupling amount is increased in reception and is decreased in transmission is proposed (see, for example, Japanese Laid-open Patent Publication No. 2007-124581). In the above mentioned radio communication device, the variable coupler is controlled in accordance with information on communication states such as an error rate and a receive field intensity of a receive signal.

On the other hand, in the case that diversity reception is to be performed using a plurality of antennas installed on a mobile terminal, in general, it is preferable that a correlation between the antennas relative to a receive signal be low. From the above mentioned viewpoint, a small portable terminal device for radio reception (a radio communication device) which is configured to obtain diversity effect by reducing a correlation between antennas is proposed (see, for example, Japanese Laid-open Patent Publication No. 2007-243455). In the above mentioned radio communication device, a plurality of antenna elements are provided on the tips of a plurality of projecting strips which are formed by notching edge parts of an upper ground conductor. The above mentioned radio communication device includes a variable reactance element and a switch as a correlation changing mechanism for changing a correlation among a plurality of antenna elements. In the above mentioned radio communication device, the correlation changing mechanism reduces the correlation among the antenna elements by changing the phase of a high-frequency current flowing through the upper ground conductor.

Incidentally, the following approximate expression (numerical formula 1) for deriving an inter-antenna correlation coefficient ρe (a coefficient of correlation ρe between antennas) from S parameters (reflection coefficients and transmission coefficients used in a network that handles high-frequency signals) of respective antennas is proposed (see, for example, ELECTRONICS LETTERS, $1_{st}$ May 2003, Vol. 39 No. 9, "Exact representation of antenna system diversity performance from input parameter description", S. Blanch, J. Romeu and I. Corbella). Use of the following numerical formula may make it possible to obtain the inter-antenna correlation coefficient from a relatively simple calculation.

$$\rho_e = \frac{|S_{11}^* S_{12} + S_{21}^* S_{22}|^2}{(1-(|S_{11}|^2+|S_{21}|^2))(1-(|S_{22}|^2+|S_{12}|^2))}$$ [Numerical Formula 1]

In the above mentioned LTE, a basic communication format that utilizes Frequency Division Duplex (FDD) system is provided for a radio communication device such as a mobile terminal with two antennas. According to the above mentioned communication format, transmission is performed via at least one of a plurality of antennas included in a radio communication device and reception is performed via at least two antennas. In an existing radio communication device, a method of effectively controlling an inter-antenna coupling amount and/or an inter-antenna correlation coefficient so as to cope with a communication format as mentioned above may not be disclosed.

For example, in an existing radio communication device in which a variable coupler is disposed between two antennas, a baseband processing unit calculates information on communication states such as an error rate and a receive filed intensity of a receive signal and the variable coupler is controlled on the basis of the information so calculated. However, an effective information acquiring method and an effective controlling method conforming to the above mentioned communication format may not be disclosed.

Therefore, the present art aims to provide a radio communication devoice and a signal processing method permitting to effectively control an inter-antenna coupling amount and/or an inter-antenna correlation coefficient in the case that a plurality of antennas including transmission and reception antennas are installed to perform communication on the basis of the frequency division duplex (FDD) system.

SUMMARY

According to an aspect of an embodiment, a radio communication device for executing a communication on the basis of a frequency division duplex, has a first antenna, a second antenna, a first receiver for receiving a first radio frequency signal via the first antenna, a second receiver for receiving the first radio frequency signal via the second antenna, a transmitter for transmitting a second radio frequency signal via the second antenna, a power measuring unit for measuring a first power of a component of the second radio frequency signal in a received signal received via the first antenna, and a control unit for controlling a reactance between the first antenna and the second antenna so as to lower an amount of coupling between the first antenna and the second antenna on the basis of the measured first power.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

(1) First Embodiment

Next, an example of a radio communication device according to a first embodiment will be described. The radio communication device according to the first embodiment is, for example, a user terminal (UE: User Equipment) that performs radio communication with a base station. The above mentioned radio communication device includes at least one transmit antenna and at least two receive antennas to perform FDD-based communication (communication on the basis of the frequency division duplex (FDD) system). The radio communication device is configured to effectively reduce the inter-antenna coupling amount.

Figure 1:
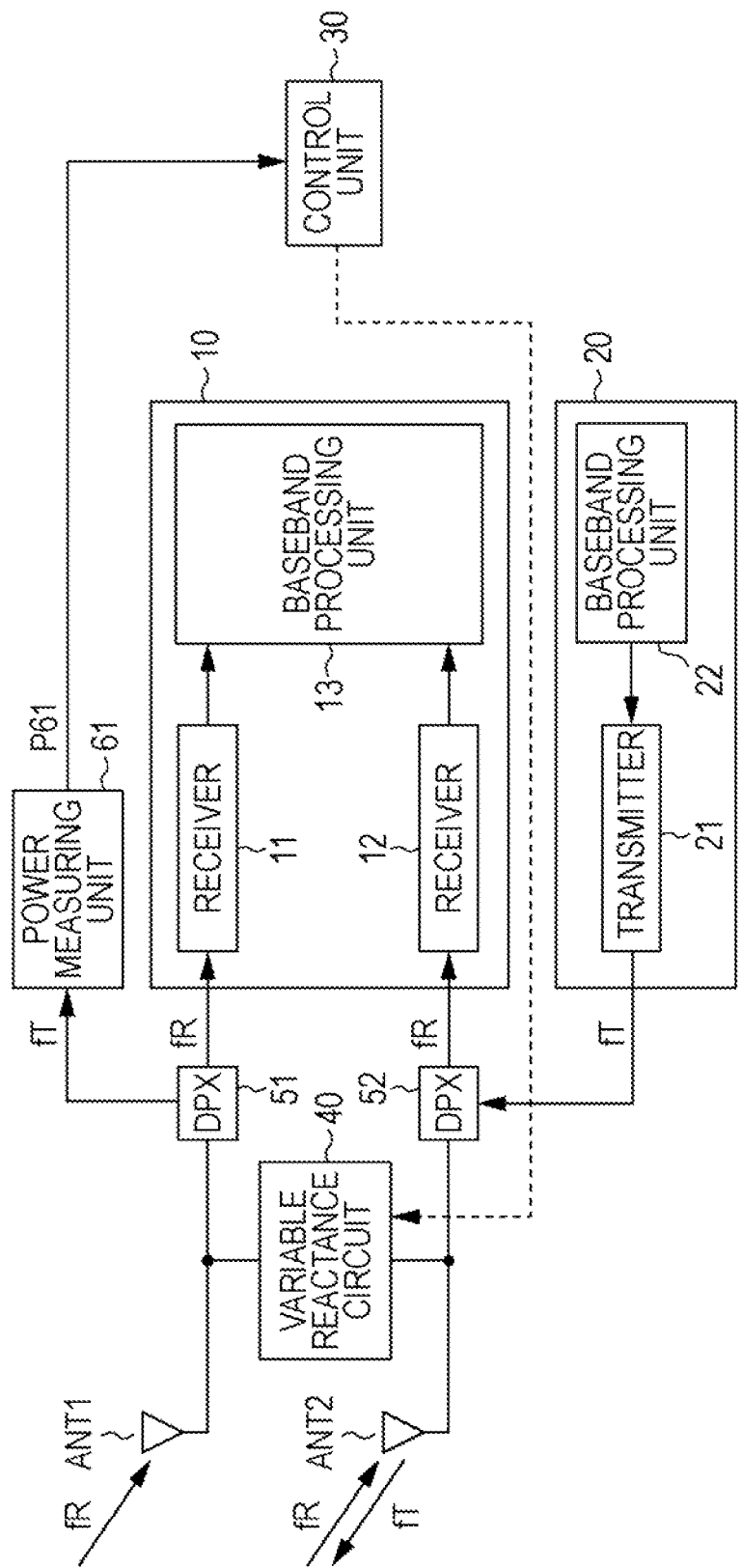
FIG. 1 is a block diagram illustrating an example of a configuration of a radio communication device according to a first embodiment.

(1-1) Configuration of Radio Communication Device:

First, an example of a configuration of a radio communication device according to the first embodiment will be described with reference to FIG. 1. FIG. 1 is a block diagram illustrating an example of a configuration of a radio communication device according to the first embodiment.

As illustrated in FIG. 1, the radio communication device includes two antennas ANT1 and ANT2, a receive signal processing unit 10, a transmit signal processing unit 20, a control unit 30, a variable reactance circuit 40, duplexers (DPXs) 51 and 52, and a power measuring unit 61.

In the radio communication illustrated in FIG. 1, the antenna ANT1 (a first antenna) is a receive antenna which is installed to receive a desired signal of a radio frequency fR (a first radio frequency) as a center frequency. The antenna ANT2 (a second antenna) is a transmit/receive antenna which is installed to receive a desired signal of the radio frequency fR (the first radio frequency) as a center frequency and to transmit a radio signal of a radio frequency fT (a second radio frequency) as a center frequency.

In the example illustrated in FIG. 1, an inter-antenna coupling amount includes a power value of a signal component which is absorbed into the device via the antenna ANT1 in a signal (a radio wave) which has been transmitted via the antenna ANT2 and a power value of a signal component which is propagated to a reception system of the antenna ANT1 through an internal substrate in a radio transmit signal which has been transmitted using a transmission system of the antenna ANT2. The duplexer 51 functions as a filter for separating a desired signal of the radio frequency fR from a signal (the signal of the power value corresponding to the coupling amount) of the radio frequency fT in receive signals which have been received via the antenna ANT1.

On the other hand, the duplexer 52 is disposed in order to use the antenna ANT2 commonly by transmission and reception systems. That is, in the case that the antenna ANT2 operates as a reception antenna, the duplexer 52 operates to pass a receive signal (the radio frequency fR) which has been received via the antenna ANT2 to the receive signal processing unit 10. In the case that the antenna ANT2 operates as a transmission antenna, the duplexer 52 operates to pass a transmit signal (the radio frequency fT) which has been transmitted from the transmit signal processing unit 20 to the antenna ANT2.

The receive signal processing unit 10 includes receivers 11 and 12 and a baseband processing unit 13.

Each of the receivers 11 and 12 includes a band limit filter, a low noise amplifier (LNA), a local frequency oscillator, an orthogonal demodulator, an AGC (Automatic Gain Control) amplifier, an A/D (Analog to Digital) converter and the like. The receivers 11 and 12 convert (down-convert) radio signals (the radio frequency fR) which have been received respectively via the antennas ANT1 and ANT2 to digital baseband signals. The baseband processing unit 13 performs various signal processing operations on the basis of the digital baseband signals obtained from the receivers 11 and 12. As the signal processing operations, for example, a time-space decoding process executed on the basis of the MIMO technique, diversity reception processing and the like are included.

The transmit signal processing unit 20 includes a transmitter 21 and a baseband processing unit 22.

The transmitter 21 includes a D/A (Digital to Analog) converter, a local frequency oscillator, a mixer, a power amplifier, a filter and the like. The transmitter 21 converts a digital baseband signal generated from the baseband processing unit 22 to an analog signal and up-converts a baseband signal to a radio signal (the radio frequency fT).

The power measuring unit 61 (a first power measuring unit) is installed to measure the power of a component (a component of a transmit signal transmitted via the antenna ANT2) of the radio frequency fT in a receive signal received using the reception system of the antenna ANT1. A power value P61 (a first power) which has been measured using the power measuring unit 61 is sent to the control unit 30.

The variable reactance circuit 40 is disposed between the antennas ANT1 and ANT2 and is configured to adjust a reactance between the antennas on instructions from the control unit 30. If the reactance of the variable reactance circuit 40 is changed, a resonance point of each antenna will be changed and the frequency characteristics of the transmission coefficients and the reflection coefficients of the antennas will be changed. Thus, if conditions other than the reactance are not changed, the inter-antenna coupling amount will be changed as the reactance of the variable reactance circuit 40 is changed.

Several examples of configurations of the variable reactance circuit 40 are illustrated in FIG. 2.

Figure 2A:
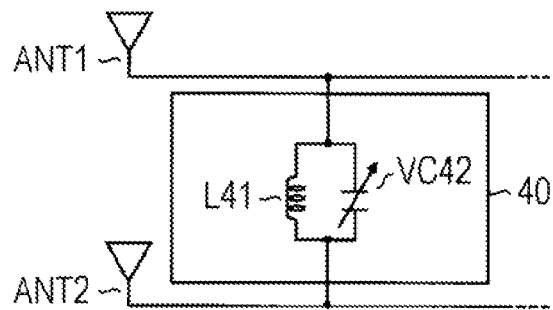
FIG. 2A is a diagram illustrating an example of a configuration of a variable reactance circuit.
Figure 2B:
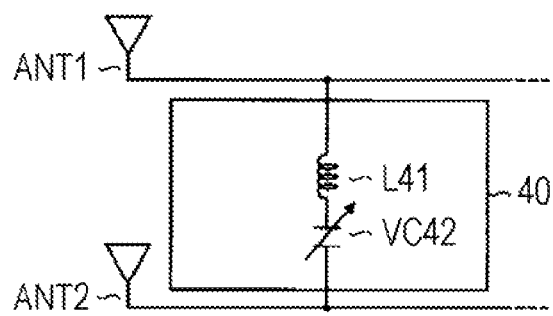
FIG. 2B is a diagram illustrating an example of a configuration of a variable reactance circuit.

In an example of the variable reactance capacitor 40 illustrated in FIG. 2A, a coil L41 and a variable capacitor VC42 are connected in parallel with each other. In an example of the variable reactance circuit 40 illustrated in FIG. 2B, the coil L41 and the variable capacitor VC42 are connected in series with each other. In the examples illustrated in FIG. 2A and FIG. 2B, the value of the variable capacitor VC42 is controlled using the control unit 30 to determine a reactance between the antennas.

Figure 2C:
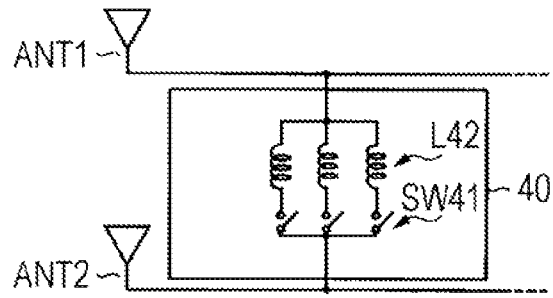
FIG. 2C is a diagram illustrating an example of a configuration of a variable reactance circuit.

In an example of the variable reactance circuit 40 illustrated in FIG. 2C, three cols L42 respectively having different inductances are respectively connected to respective switches constituting a switch group SW41. In the example illustrated in FIG. 2C, the conductive state of each of the switches constituting the switch group SW41 is controlled using the control unit 30 to determine the reactance between the antennas.

Figure 2D:
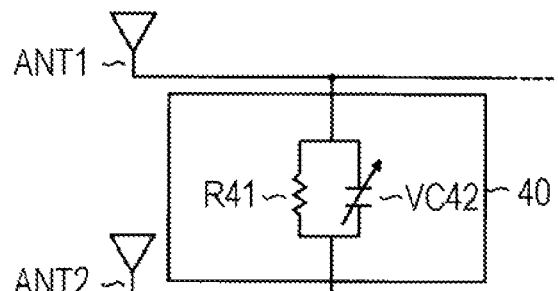
FIG. 2D is a diagram illustrating an example of a configuration of a variable reactance circuit.

In an example of the variable reactance circuit 40 illustrated in FIG. 2D, a resistor R41 and the variable capacitor VC42 are connected in parallel with each other. In the example illustrated in FIG. 2D, the value of the variable capacitor VC42 is controlled using the control unit 30 to determine the reactance between the antennas.

The control unit 30 adaptively controls the variable reactance circuit 40 on the basis of the power value P61 sent from the power measuring unit 61 such that the amount of coupling between the antennas ANT1 and ANT2 is typically maintained low. The above mentioned control is repetitively performed at relatively short time intervals so as to obtain a favorable reactance between the antennas conforming to an environment in which the above mentioned radio communication device is used. The control performed using the control unit 30 will be described later.

Figure 3:
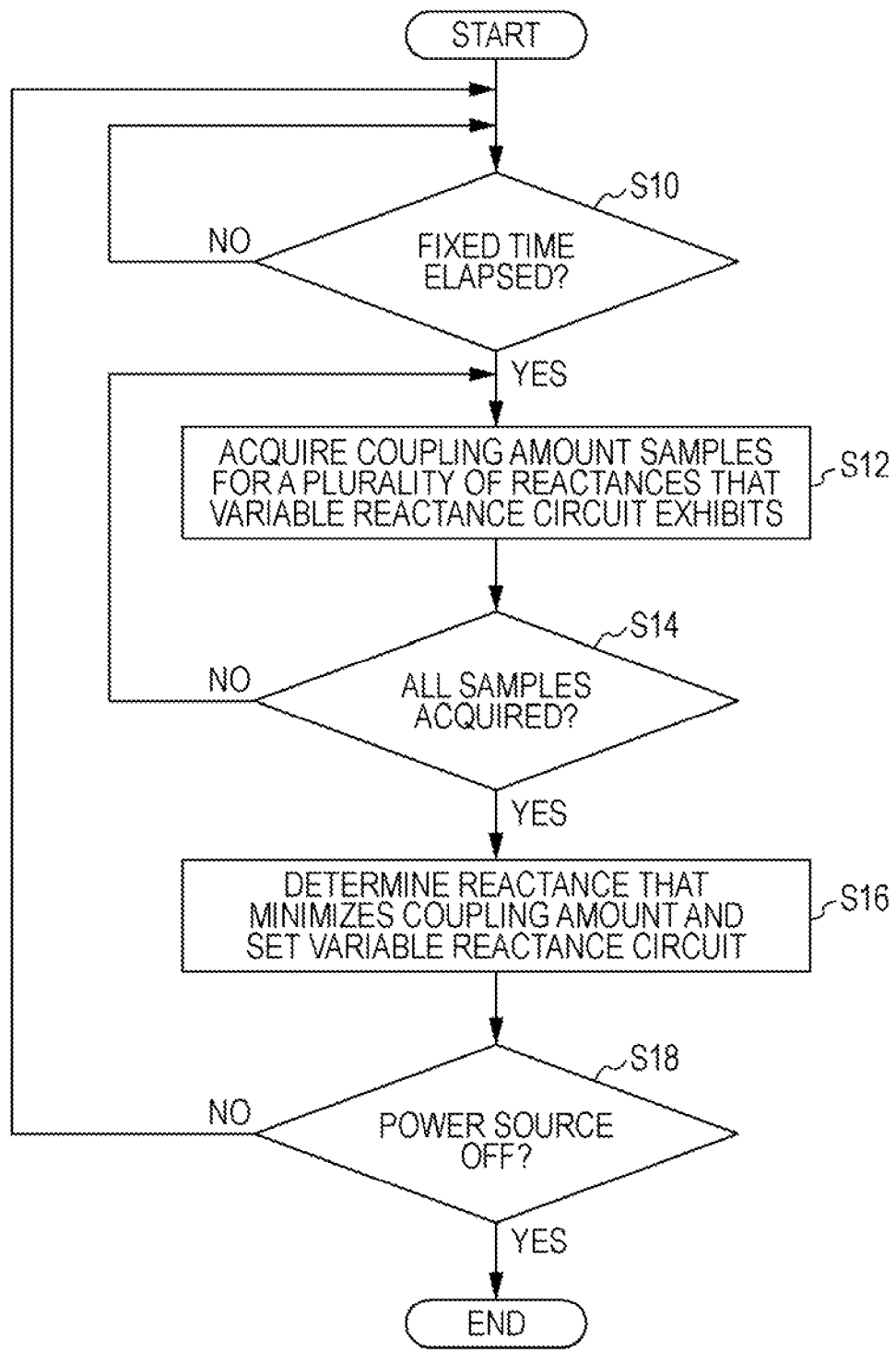
FIG. 3 is a diagram illustrating an example of a flowchart indicating the contents of control executed using a radio communication device according to the first embodiment.

(1-2) Contents of Control:

Next, the contents of the control performed using the above mentioned radio communication device will be described with reference to FIG. 3. FIG. 3 is a diagram illustrating an example of a flowchart indicating the contents of the control performed using the above mentioned radio communication device. Processes in the flowchart are mainly executed using the control unit 30.

In the flowchart, substantially, the processes at steps S12 to S16 are repetitively executed at fixed time intervals until the power source of the radio communication device is turned OFF (step S18). That is, when a fixed time has elapsed from execution of the previous control (YES at step S10), the processes at step S12 and succeeding steps are again executed. First, the control unit 30 acquires samples of the coupling amount for a plurality of reactances that the variable reactance circuit 40 may exhibit, that is, for reactances within an adjustable range (step S12). In the example illustrated in FIG. 3, the inter-antenna coupling amount is the power value P61 which is sent from the power measuring unit 61. For example, in the case that the variable reactance circuit 40 is configured as illustrated in FIG. 2A, the control unit 30 acquires the power value P61 as a sample of the coupling amount for each of a plurality of capacitances that the variable capacitor VC42 may exhibit. When all the samples have been acquired, the process proceeds to step S16 (step S14).

At step S16, the control unit 30 determines a reactance (in the example in FIG. 2A, a capacitance of the variable capacitor VC42) at which the coupling amount is minimized in the plurality of coupling amount samples which have been acquired at step S12. Then, the control unit 30 sets the variable reactance circuit 40 such that the determined reactance may be obtained. The reactance so determined is maintained until the next control is started.

Incidentally, in the example of the flowchart illustrated in FIG. 3, it is preferable that a time interval at which the control is executed (the fixed time at step S10) be short enough to immediately cope with a change in environment in which the radio communication device is used.

(1-3) Operation of Radio Communication Device:

Next, the operation which is performed using the above mentioned radio communication device in relation to the control of the coupling amount will be described as follows.

That is, the radio communication device communicates with another communication device such as, for example, a base station on the basis of the FDD system. That is, the radio communication device receives a desired signal having the radio frequency fR as the center frequency in reception and transmits a radio signal having the radio frequency fT as the center frequency in transmission. In addition, data reception is performed via the both antennas ANT1 and ANT2 and data transmission is performed via the antenna ANT2. In the data reception and/or transmission, a part (a component) of a transmit signal which has been transmitted via the antenna ANT2 is absorbed into a reception system of the antenna ANT1 in such a manner that it is airborne and absorbed into the reception system of the antenna ANT1 and/or it is propagated to the reception system of the antenna ANT1 through an internal substrate or the like. The power value of the signal component so absorbed corresponds to the inter-antenna coupling amount.

The duplexer 51 extracts a transmit frequency component from a receive signal which has been received using the reception system of the antenna ANT1 and the power measuring unit 61 measures the power value P61 of the component. Each power value P61 so measured is sent to the control unit 30 each time as the coupling amount. Therefore, in the above mentioned radio communication device, the coupling amount may be calculated using a simple configuration including only the duplexers and the power measuring unit in FDD-based communication.

In the above mentioned radio communication device, if a reactance between the antennas is not adjusted, it may sometimes occur that the inter-antenna coupling amount is increased depending on an environment in which the user uses the device (for example, depending on whether the user uses the radio communication device in the car or out of the car or depending on a manner that the user carries the radio communication device). In order to maintain the value of the coupling amount typically low, the control unit 30 adaptively controls the variable reactance circuit 40 at a fixed time interval. For example, it is assumed that the user has changed the manner of carrying a portable terminal serving as the radio communication device. In the above mentioned situation, the control (see FIG. 3) is repetitively performed at a relatively short time interval, so that the respective processes illustrated in FIG. 3 are again executed immediately after the user has changed the manner of carrying the radio communication device. As a result, the variable reactance circuit 40 is reset so as to immediately obtain an optimum reactance conforming to the freshly taken manner of carrying the radio communication device.

As described above, the above mentioned radio communication device includes at least one transmit antenna and at least two receive antennas to perform FDD-based communication. In communication, the transmit frequency component is extracted from the receive signal which has been received using the reception system and the power value of the component is obtained as the coupling amount. Then, the sample of the coupling amount for each of the plurality of reactances which may be exhibited between the antennas is acquired at fixed time intervals to adaptively determine each optimum reactance.

In the above mentioned radio communication device, the coupling amount to be controlled is obtained using the simple configuration only including the duplexers and the power measuring unit, so that effective control of the inter-antenna coupling amount may be realized.

(2) Second Embodiment

Next, an example of a radio communication device according to a second embodiment will be described. The radio communication device according to the second embodiment is configured so as to effectively reduce the inter-antenna coupling amount as in the case with the radio communication device according to the first embodiment. The radio communication device according to the second embodiment is different from that of the first embodiment in that it is configured to increase the accuracy of control.

Figure 4:
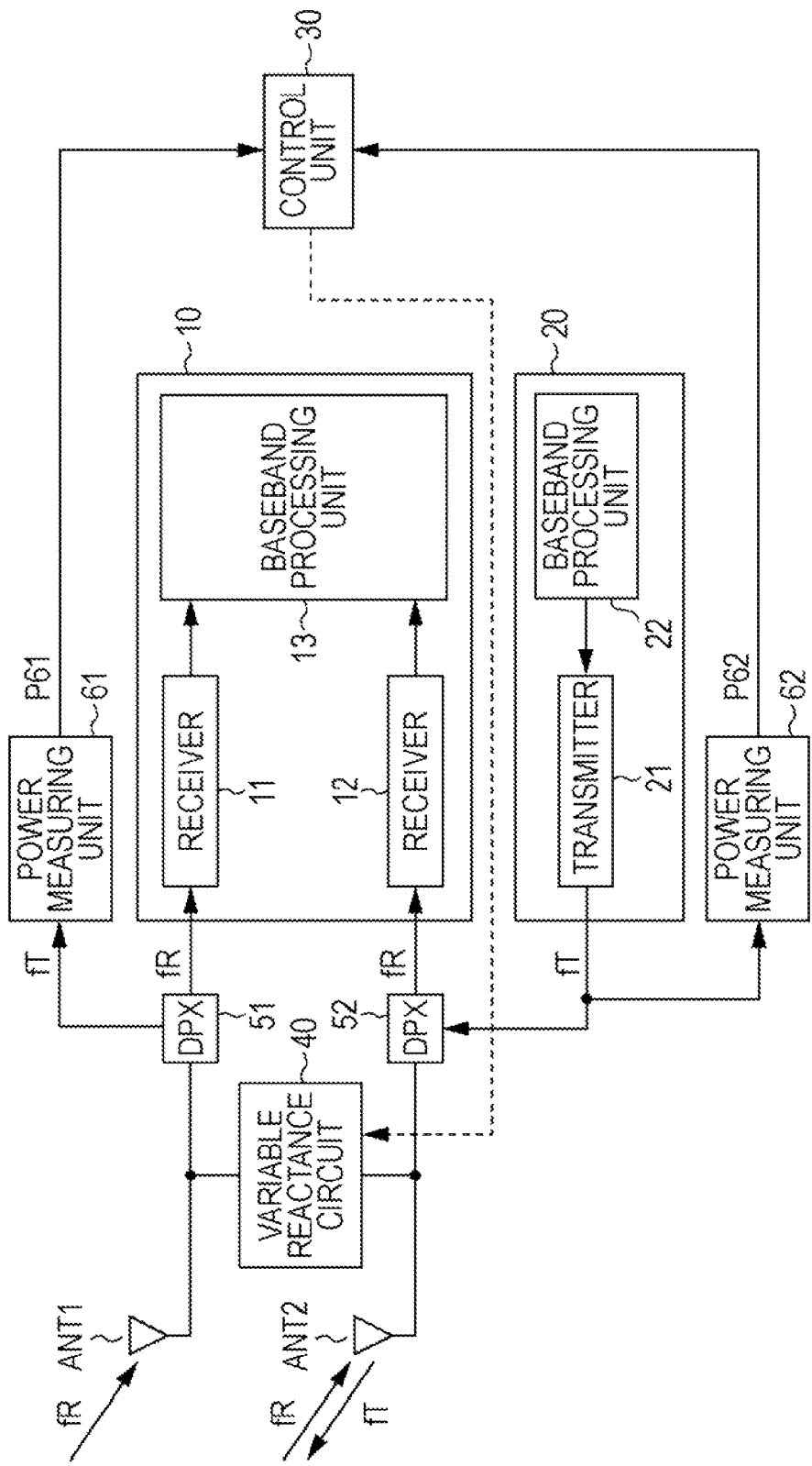
FIG. 4 is a block diagram illustrating an example of a configuration of a radio communication device according to a second embodiment.

Next, an example of a configuration of the above mentioned radio communication device will be described with reference to FIG. 4. FIG. 4 is a block diagram illustrating an example of a configuration of the above mentioned radio communication device according to the second embodiment.

In constitutional elements illustrated in FIG. 4, the same numerals are assigned to the same constitutional elements as those in the first embodiment illustrated in FIG. 1 and description thereof will be omitted. The radio communication device illustrated in FIG. 4 differs from that in FIG. 1 in that another power measuring unit 62 is added.

The power measuring unit 62 (a second power measuring unit) measures the power of a transmit signal (the radio frequency fT) which has been transmitted from the transmit signal processing unit 20 and sends a measured power value P62 (a second power) to the control unit 30.

The control unit 30 calculates a ratio of the power value P61 which has been measured using the power measuring unit 61 to the power value P62 which has been measured using the power measuring unit 62 (P61/P62) as the inter-antenna coupling amount of the above mentioned radio communication device. The contents of control executed using the control unit 30 is the same as that illustrated in FIG. 3.

In the above mentioned radio communication device according to the first embodiment, the coupling amount is obtained simply by using the absolute value of the power value P61 (see FIG. 1) of the transmit frequency component of the receive signal which has been received using the reception system of the antenna ANT1 without taking the level of a transmit signal into consideration. Therefore, for example, if the power value P61 which is sent to the control unit 30 is fixed, the same result of control will be obtained regardless of a change in level of the transmit signal. However, in general, it is thought that the higher the level of a transmit signal transmitted via a transmit antenna is, the higher the level of a signal which is absorbed via a receive antenna is. Therefore, it is preferable to take the transmit power into consideration in calculation of the coupling amount. From the above mentioned viewpoint, in the above mentioned radio communication device, the magnitude of the level of the transmit signal which is transmitted via the antenna ANT2 is taken into consideration to calculate the ratio of the power value P61 to the power value P62 as the coupling amount.

As described above, with the use of the above mentioned radio communication device, it may become possible to control the inter-antenna coupling amount with higher accuracy. In addition, as in the case with the first embodiment, the coupling amount to be controlled may be obtained using a simple configuration including only the duplexers and the power measuring units, so that effective control of the inter-antenna coupling amount may be realized.

The examples of the configurations of the first and second embodiments have been described. However, the configuration of antennas is not limited to those as illustrated in FIG. 1 and FIG. 4. The present art may be readily applicable to configurations including three or more antennas on the basis of the above mentioned embodiments.

Figure 5:
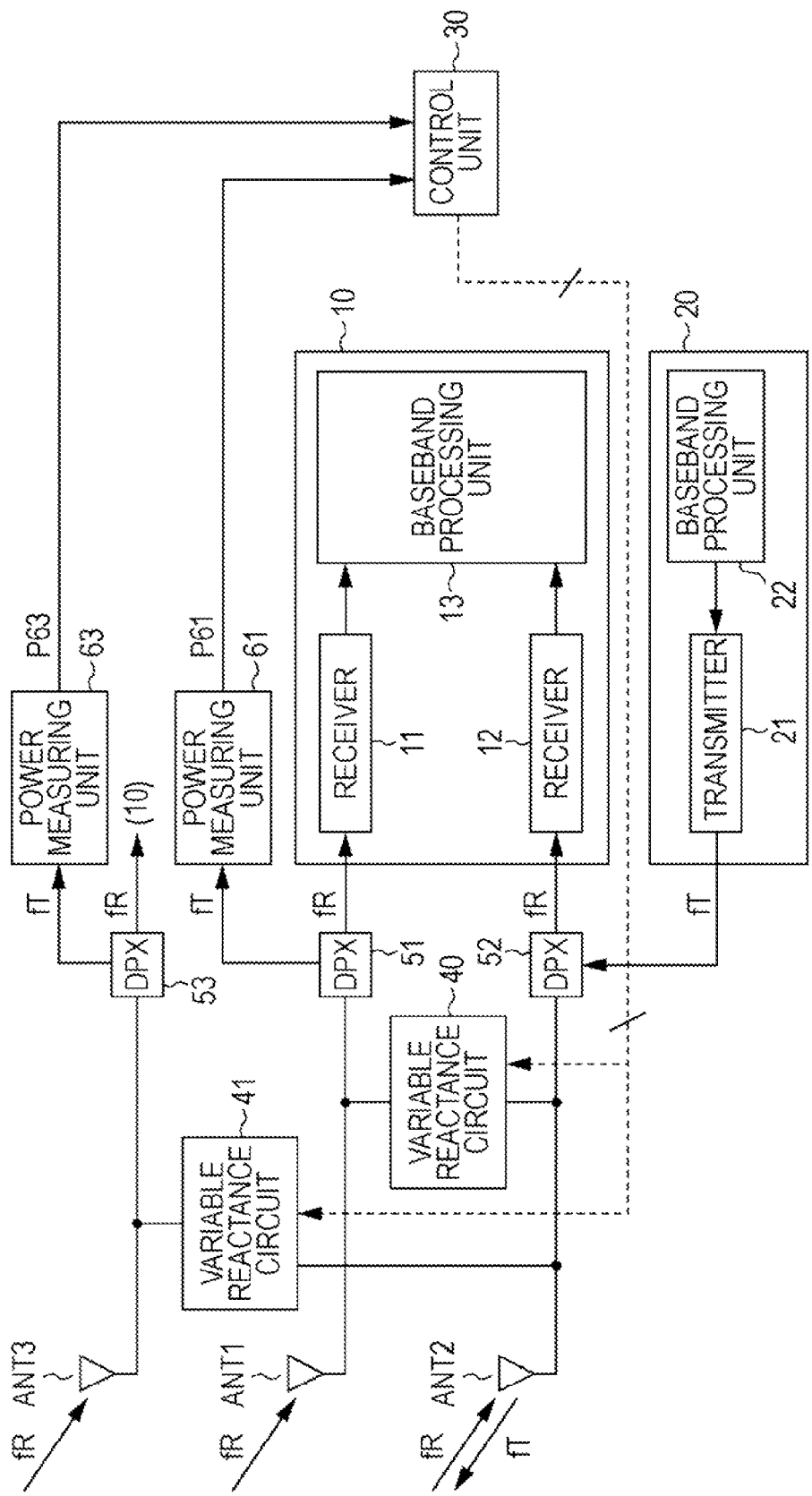
FIG. 5 is a block diagram illustrating an example of a configuration of a radio communication device according to an altered example of an embodiment.

For example, FIG. 5 is a block diagram illustrating an example of a configuration of a radio communication device according to an altered example of the first embodiment. The configuration of the radio communication device illustrated in FIG. 5 differs from that illustrated in FIG. 1 in that an antenna ANT3 for reception is added. In the example of the radio communication device illustrated in FIG. 5, a duplexer 53 extracts a transmit frequency component from a receive signal which has been received using a reception system of the antenna ANT3 and a power measuring unit 63 measures a power value P63 of the component. Each power value P63 is sent to the control unit 30 each time as an amount of coupling between the antennas ANT1 and ANT3. Then, the reactance of a variable reactance circuit 41 which is disposed between the antennas ANT1 and ANT3 is set on the basis of the coupling amount so sent.

In the above mentioned embodiments, the examples of the radio communication device which includes one receive antenna (the antenna ANT1) and one transmit/receive antenna (the antenna ANT2) have been described. However, the configuration of antennas is not limited to the above. In the above mentioned embodiments, it is obvious that the receive signal which is received via the antenna ANT2 has no influence on the control executed using the control unit 30. Thus, the radio communication device needs only have an antenna configuration including at least one receive signal and at least one transmit antenna.

(3) Third Embodiment

Next, an example of a radio communication device according to a third embodiment will be described. The radio communication device according to the third embodiment may be, for example, user equipment (UE) that performs radio communication with a base station. The radio communication device includes at least one transmit antenna and at least two receive antennas and performs FDD-based communication with a base station. For example, in order to favorably perform diversity reception, it is preferable that correlation between two receive antennas be low for a desired signal to be received from a mate communication device (for example, a base station) (that is, the inter-antenna correlation coefficient is low). From the above mentioned viewpoint, the above mentioned radio communication device is configured to reduce the inter-antenna correlation coefficient. In the above mentioned case, in the above mentioned radio communication device, a reflection component of a transmit signal which has been transmitted via the transmit antenna and a signal component which is included in a signal transmitted via one antenna and is received via another antenna are utilized in calculation of the inter-antenna correlation coefficient.

In the above mentioned situation, in the radio communication device including at least two antennas, in the case that a two-terminal pair network in which two antennas ANT1 and ANT2 serve as input and output ports is imagined, the two-terminal pair network is expressed by S parameters as follows.

That is,

S11: a reflection coefficient of the antenna ANT2 (a reflection coefficient at which a signal is reflected from the antenna ANT2), S22: a reflection coefficient of the antenna ANT1 (a reflection coefficient at which a signal is reflected from the antenna ANT1), S21: a coefficient of transmission from the antenna ANT2 to the antenna ANT1 (a transmission coefficient at which a signal transmitted from the antenna ANT2 to the antenna ANT1), and S12: a coefficient of transmission from the antenna ANT1 to the antenna ANT2 (a transmission coefficient at which a signal is transmitted from the antenna ANT1 to the antenna ANT2).

In the above mentioned situation, in general, S21=S12. Thus, in the case that the phase is not taken into consideration, the coefficient ρe of correlation between two antennas ANT1 and ANT2 may be calculated using the following expression on the basis of the above mentioned approximate expression (the numerical formula 1). In the example of the second embodiment, the coefficient of correlation between two antennas ANT1 and ANT2 is calculated using the following numerical formula 2.

$$\rho_e = \frac{|S_{21}|^2(|S_{11}|^2 + |S_{22}|^2)}{(1-(|S_{11}|^2+|S_{21}|^2))(1-(|S_{22}|^2+|S_{21}|^2))}$$ [Numerical Formula 2]

In addition, in the example of the third embodiment, for example, it is assumed that the antennas ANT1 and ANT2 are almost the same as each other in configuration and are disposed on a substrate of the radio communication device in symmetry. In the above mention situation, the reflection coefficient of the antenna ANT1 may be regarded to be the same as that of the antenna ANT2 (S11=S22).

Figure 6:
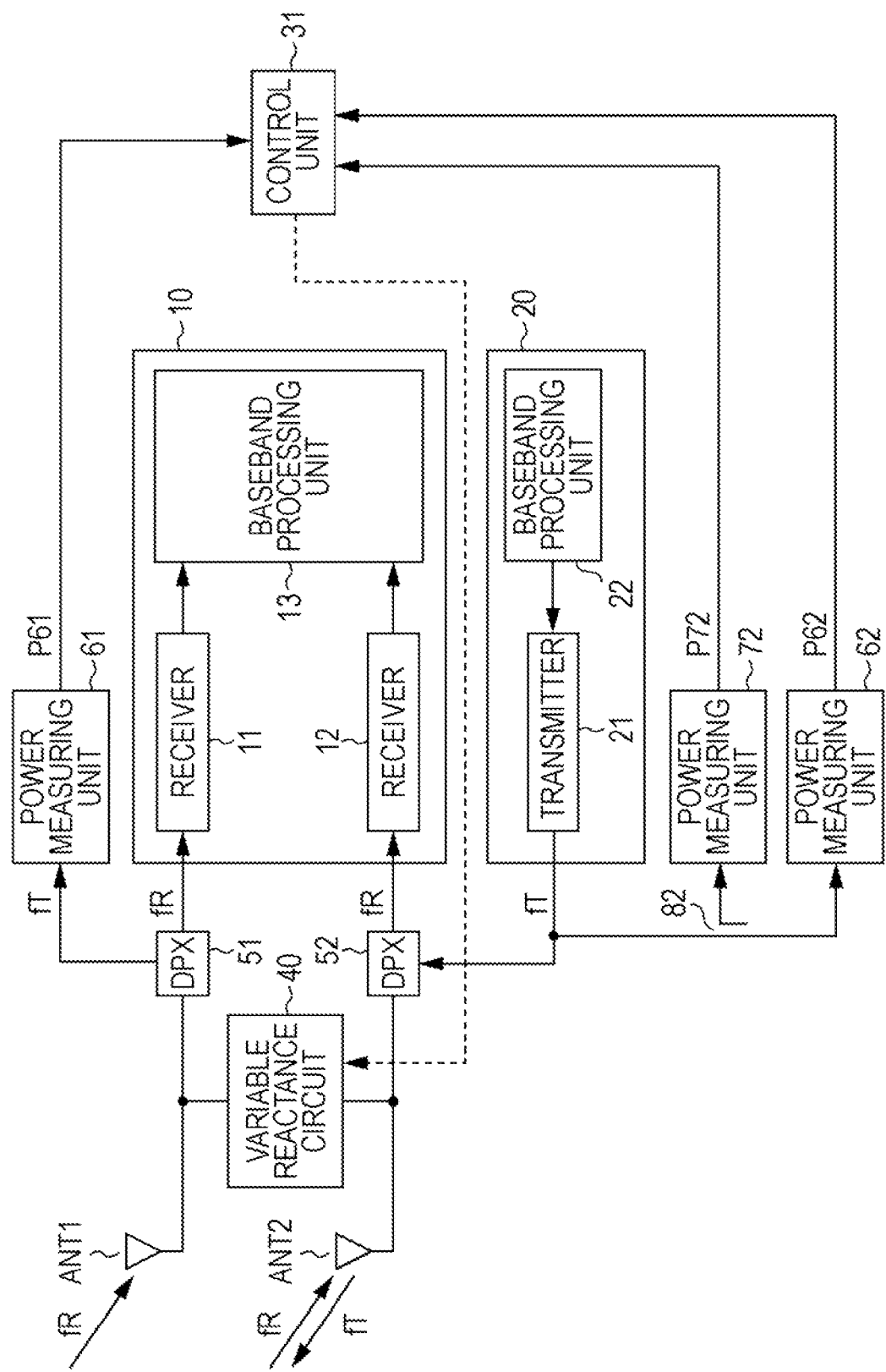
FIG. 6 is a block diagram illustrating an example of a configuration of a radio communication device according to a third embodiment.

(3-1) Configuration of Radio Communication Device:

Next, an example of a configuration of the radio communication device according to the third embodiment will be described with reference to FIG. 6. FIG. 6 is a block diagram illustrating an example of a configuration of the radio communication device according to the third embodiment.

Detailed description of the constitutional elements of the radio communication device illustrated in FIG. 6 which are the same as those of the first embodiment illustrated in FIG. 4 will be omitted. The radio communication device illustrated in FIG. 6 differs from the device illustrated in FIG. 4 in that a directional coupler 82 and a power measuring unit 72 are added and a control unit 31 is included in place of the control unit 30.

The directional coupler 82 is installed on the transmission system and sends a signal component reflected from the antenna ANT2 in a transmit signal to the power measuring unit 72. The power measuring unit 72 (a third power measuring unit) measures a power value 72 (a third power) of the reflection signal component and sends the control unit 31 the measured power value 72.

The measuring unit 62 measures a power value 62 of a transmit signal (the radio frequency fT) sent from the transmit signal processing unit 20 and sends the control unit 31 the measured power value P62.

The power measuring unit 61 is installed to measure a power value 61 of a component (a component of a transmit signal transmitted via the antenna ANT2) of the radio frequency fT in a receive signal received using the reception system of the antenna ANT1. The power value P61 which has been measured using the power measuring unit 61 is sent to the control unit 31.

The control unit 31 calculates the inter-antenna correlation coefficient on the basis of the power values P61, P62 and P72 which are respectively sent from the power measuring units 61, 62 and 72. In the above mentioned case, first, the control unit 31 calculates the reflection coefficient (S11) of the antenna ANT2 by obtaining a ratio P72/P62 and then calculates the coefficient of transmission from the antenna ANT2 to the antenna ANT1 by obtaining a ratio P61/P62. In the second embodiment, it is assumed that S22=S11 and S12=S21. Thus, it is the case that the values of all the S parameters have been calculated. After calculation of the values of S parameters, the control unit 31 calculates the correlation coefficient ρe on the basis of the above numerical formula 2.

Figure 7:
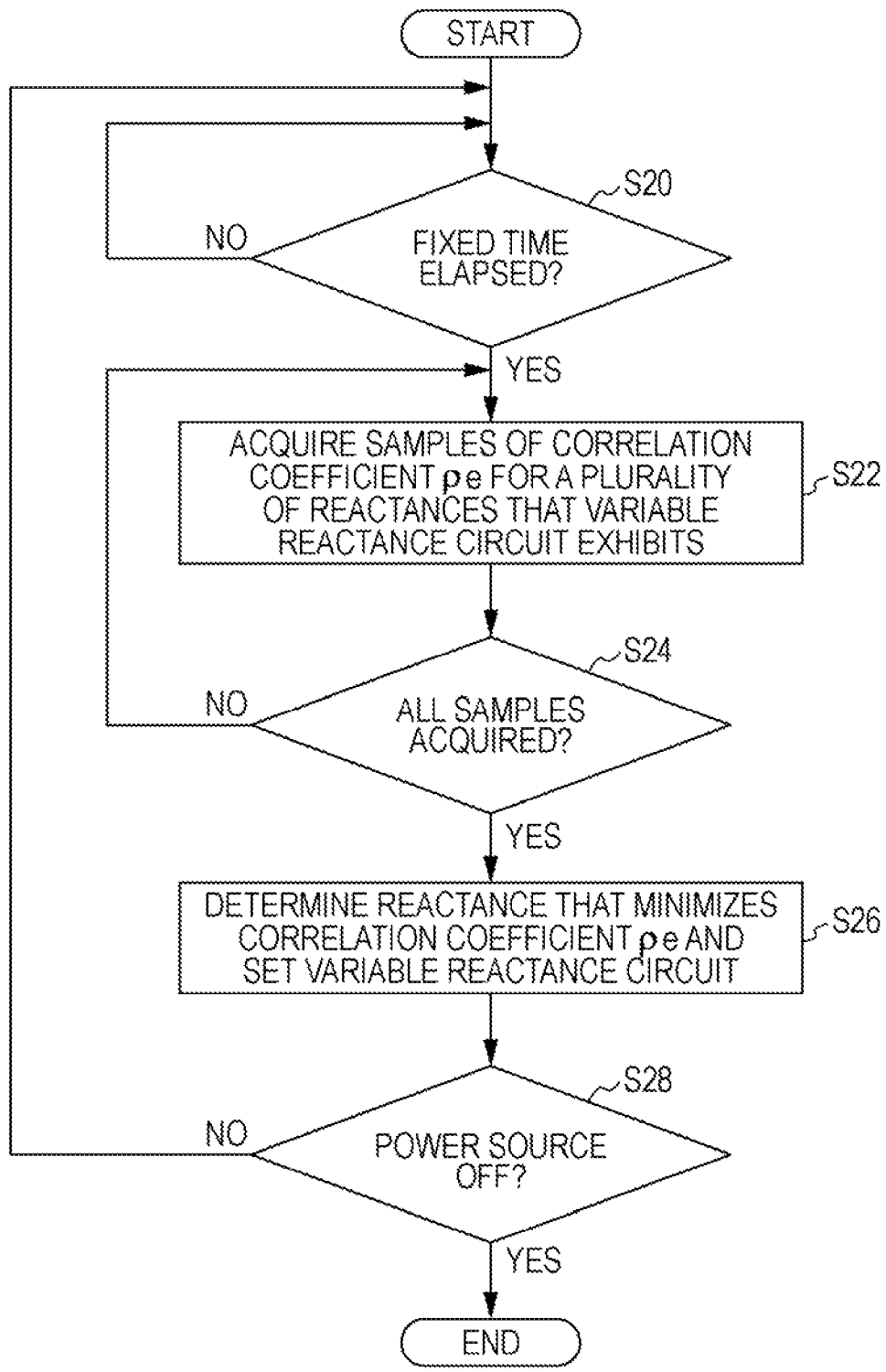
FIG. 7 is a diagram illustrating an example of a flowchart indicating the contents of control executed using a radio communication device according to the third embodiment.

(3-2) Contents of Control:

Next, the contents of control performed using the above mentioned radio communication device will be described with reference to FIG. 7. FIG. 7 is a diagram illustrating an example of a flowchart indicating the contents of the control performed using the above mentioned radio communication device. Incidentally, processes of the flowchart are mainly executed using the control unit 31.

In the flowchart, substantially, the processes at steps S22 to S26 are repetitively executed at fixed time intervals until the power source of the radio communication device is turned OFF (step S28). That is, when a fixed time has elapsed from execution of the previous control (YES at step S20), the processes at step S22 and succeeding steps are again executed. First, the control unit 31 acquires samples of the correlation coefficient ρe for a plurality of reactances that the variable reactance circuit 40 may exhibit, that is, for reactances within an adjustable range (step S22). In the example illustrated in FIG. 7, the inter-antenna correlation coefficient ρe is calculated on the basis of the power values P61, P62 and P72 as described above. For example, in the case that the variable reactance circuit 40 is configured as illustrated in FIG. 2A, the control unit 31 calculates the correlation coefficient ρe for each of a plurality of capacitances that the variable capacitor VC 42 may exhibit and acquires a plurality of samples of the correlation coefficient. When all the samples have been acquired, the process proceeds to step S26 (step S24).

At step S26, the control unit 31 determines a reactance (in the example in FIG. 2A, a capacitance of the variable capacitor VC42) at which the correlation coefficient is minimized in the plurality of correlation coefficient samples which have been acquired at step S22. Then, the control unit 31 sets the variable reactance circuit 40 such that the determined reactance may be obtained. The reactance so determined is maintained until the next control is started.

Incidentally, in the example of the flowchart illustrated in FIG. 7, it is preferable that a time interval at which each control is executed (the fixed time at step S0) be short enough to immediately cope with a change in environment in which the radio communication device is used.

(3-3) Operation of Radio Communication Device:

Next, the operation which is performed using the above mentioned radio communication device in relation to control of the correlation coefficient will be described as follows.

That is, the radio communication device performs FDD-based communication with another communication device such as, for example, a base station. That is, the radio communication device receives a desired signal having the radio frequency fR as the center frequency in reception and transmits a radio signal having the radio frequency fT as the center frequency in transmission. In addition, signal reception is performed via the both antennas ANT1 and ANT2 and signal transmission is performed via the antenna ANT2. In signal reception and/or transmission, the radio communication device acquires the transmit power value (P62) of the signal transmitted via the antenna ANT2, the power value (P72) of the signal reflected from the antenna ANT2, and the power value (P61) of the transmit frequency component which is extracted from the receive signal which has been received using the reception system of the antenna ANT1. The control unit 31 calculates the inter-antenna correlation coefficient ρe on the basis of the acquired power values (P61, P62 and P72). Therefore, in the above mentioned radio communication device, the inter-antenna correlation coefficient may be calculated using a simple configuration including the duplexers and the power measuring units when FDD-based communication is performed.

In the above mentioned radio communication device, if a reactance between the antennas is not adjusted, it may sometimes occur that the inter-antenna correlation coefficient is increased depending on an environment in which the user uses the device (for example, depending on whether the user uses the radio communication device in the car or out of the car or depending on a manner that the user carries the radio communication device). In order to maintain the value of the correlation coefficient typically low, the control unit 31 adaptively controls the variable reactance circuit 40 at fixed time intervals. For example, it is assumed that the user has changed the manner of carrying a portable terminal serving as the radio communication device. In the above mentioned situation, in the example illustrated in the drawing, the control (see FIG. 7) is repetitively performed at relatively short time intervals, so that the respective processes illustrated in FIG. 7 are again executed immediately after the manner that the user carries the radio communication device has been changed. As a result, the variable reactance circuit 40 is reset so as to immediately obtain an optimum reactance conforming to the freshly taken manner of carrying the device.

As described above, the above mentioned radio communication device includes at least one transmit antenna and at least two receive antennas to perform FDD-based communication. In communication, the inter-antenna correlation coefficient is calculated on the basis of the power values obtained from the transmission system and the reception system. Then, a sample of the inter-antenna correlation coefficient for each of a plurality of reactances which may be exhibited between the antennas is acquired at fixed time intervals to adaptively determine an optimum reactance.

In the above mentioned radio communication device, the correlation coefficient to be controlled is obtained using a simple configuration only including the duplexers and the power measuring units, so that effective control of the inter-antenna correlation coefficient may be realized.

(4) Fourth Embodiment

Next, an example of a radio communication device according to a fourth embodiment will be described. The radio communication device according to the fourth embodiment is configured so as to effectively reduce the inter-antenna correlation coefficient as in the case with the radio communication device according to the third embodiment. The radio communication device according to the fourth embodiment is different from that of the third embodiment in that it is configured to increase the accuracy in control. Specifically, the device according to the fourth embodiment is configured to calculate the reflection coefficient of the antenna ANT1 unlike the device in the third embodiment. Therefore, as will be described later, a local oscillator, a power measuring unit and the like used to measure the reflection power of a reflection signal reflected from the antenna ANT1 are added unlike the configuration of the third embodiment.

Figure 8:
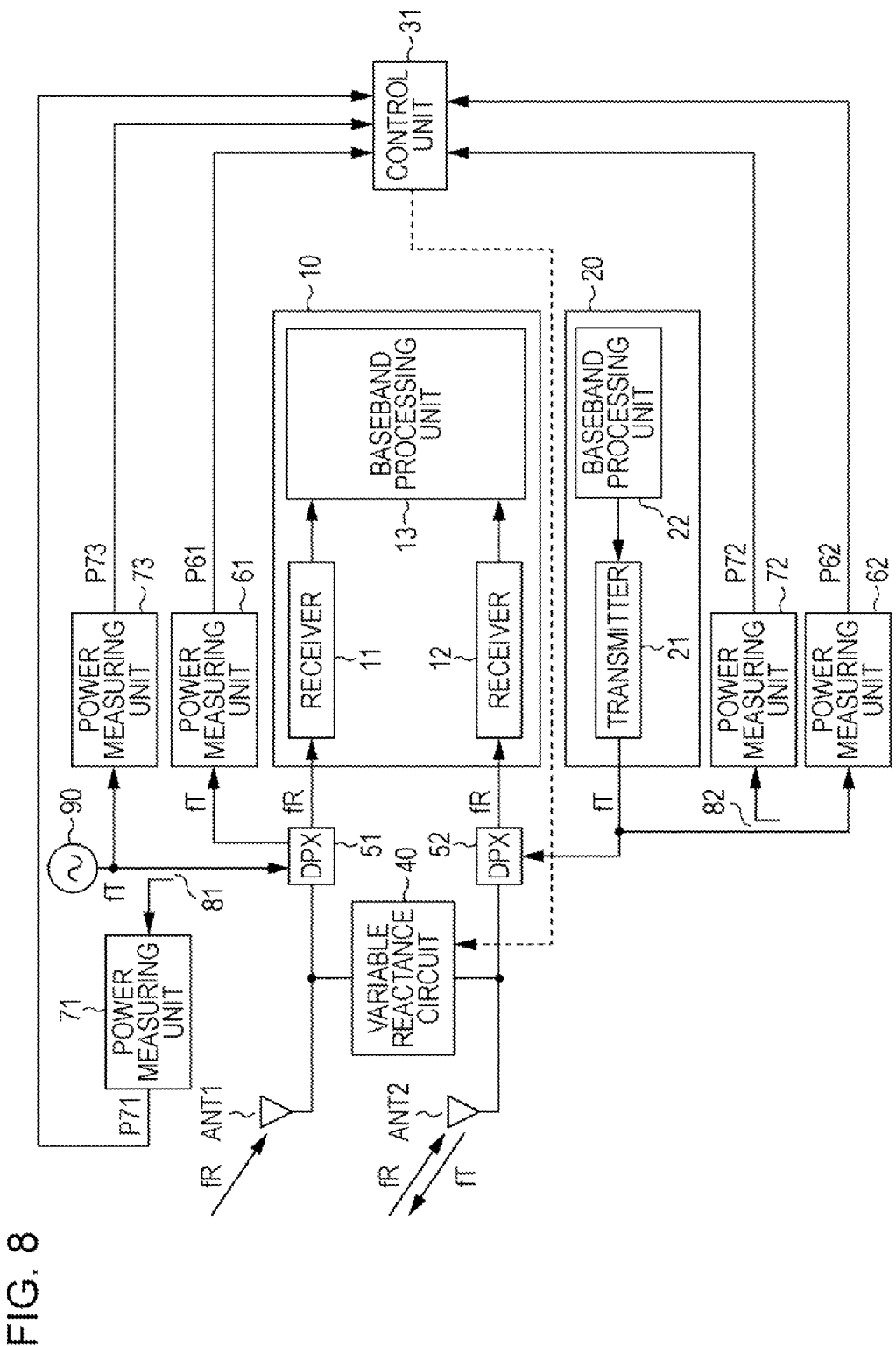
FIG. 8 is a block diagram illustrating an example of a configuration of a radio communication device according to a fourth embodiment.

Next, an example of a configuration of the above mentioned radio communication device will be described with reference to FIG. 8. FIG. 8 is a block diagram illustrating an example of a configuration of the above mentioned radio communication device.

In constitutional elements illustrated in FIG. 8, the same numerals are assigned to the same constitutional elements as those in the third embodiment illustrated in FIG. 6 and description thereof will be omitted. The radio communication device illustrated in FIG. 8 differs from that illustrated in FIG. 6 in that a power measuring unit 71, a power measuring unit 73, a directional coupler 81 and a local oscillator 90 are freshly added.

The local oscillator 90 generates a signal (a first radio signal) of a radio frequency which is the same as the transmit frequency fT (the second radio frequency) of the antenna ANT2 and sends the generated signal to the antenna ANT1 via the duplexer 51. The power measuring unit 73 (a fourth power measuring unit) measures the power of the radio signal which is generated using the local oscillator 90 and sends a measured power value P73 (a fourth power) to the control unit 31. In addition, the directional coupler 81 takes out the reflection signal reflected from the antenna ANT1 for the radio signal which is sent from the local oscillator 90 and the power measuring unit 71 (a fifth power measuring unit) measures the reflection power of the reflection signal. The measured reflection power P71 (a fifth power) is sent to the control unit 31.

The control unit 31 calculates the correlation coefficient on the basis of the power values P61, P62, P72, P71 and P73 which are respectively sent from the power measuring units 61, 62, 72, 71 and 73. In calculation, the fourth embodiment is the same as the third embodiment in that, first, the control unit 31 calculates the reflection coefficient (S11) of the antenna ANT2 by obtaining the ratio P72/P62 and then calculates the coefficient (S21) of transmission from the antenna ANT2 to the antenna ANT1 by obtaining the ratio P61/P62. In addition to the above mentioned calculation, in the fourth embodiment, the control unit 31 calculates the reflection coefficient (S22) of the antenna ANT1 by obtaining a ratio P71/P73. After calculation of values of the S parameters, the control unit 31 calculates the correlation coefficient ρe on the basis of the above mentioned numerical formula 2.

Incidentally, as in the case in the third embodiment, the correlation coefficient ρe is calculated under the assumption that S12=S21.

In the fourth embodiment, the contents of control performed using the control unit 31 is the same as that of the example illustrated in FIG. 7.

As described above, in the above mentioned radio communication device, the local oscillator and the power measuring units used to calculate the reflection power of the reflection signal reflected from the antenna ANT1 are installed on the reception system of the antenna ANT1 so as to calculate the reflection coefficient (S22) of the antenna ANT1. Therefore, the accuracy in calculation of the correlation coefficient ρe is more increased than that attained in the third embodiment and hence a reactance between the antennas may be more appropriately set.

Incidentally, although in the above mentioned third and fourth embodiments, the correlation coefficient ρe is calculated on the basis of the numerical formula 2 in which the phase of each S parameter is not taken into consideration, the accuracy in calculation of the correlation coefficient ρe may be more increased by calculating it by taking the phase of each S parameter into consideration (that is, on the basis of the numerical formula 1).

Figure 9:
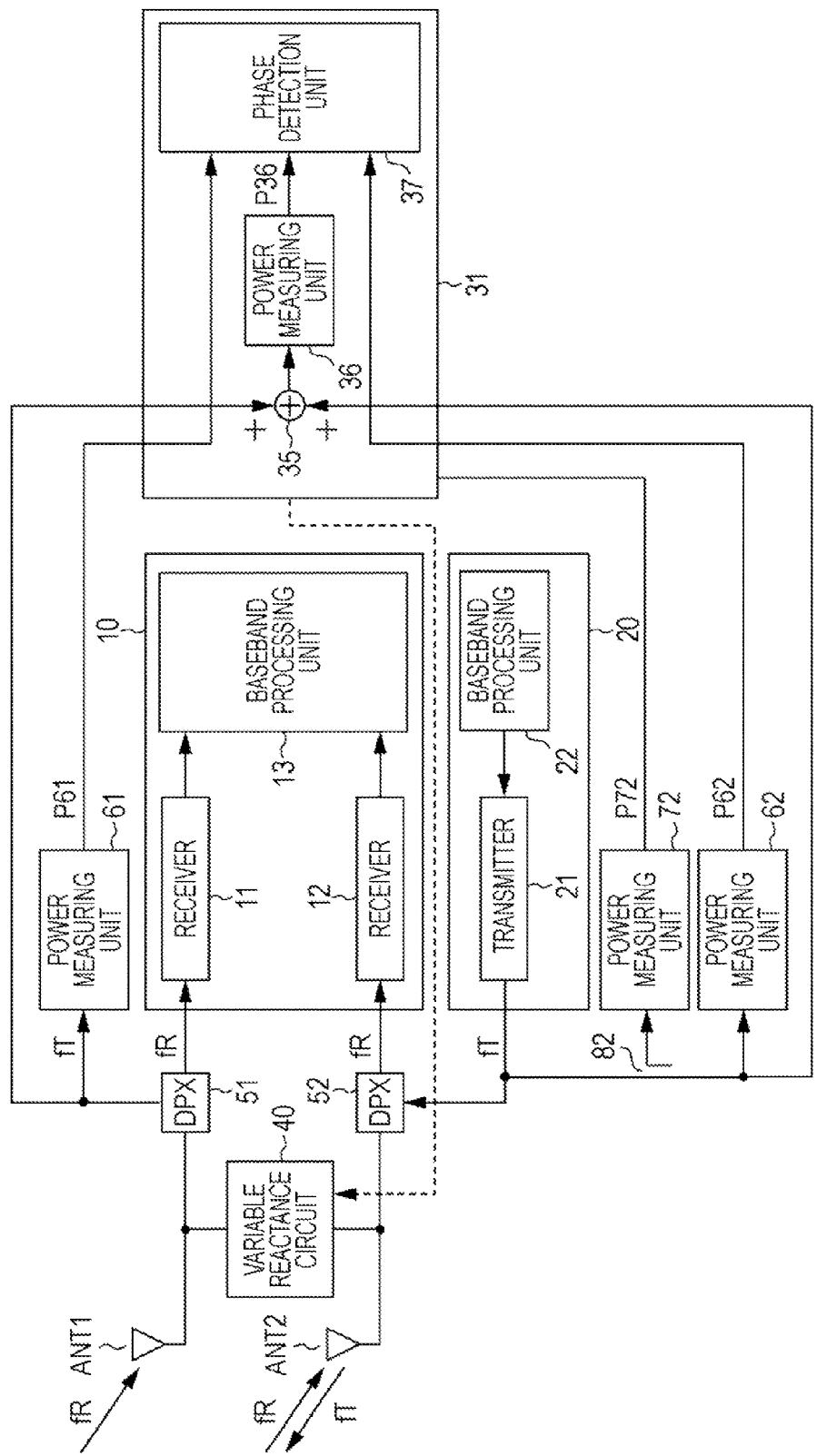
FIG. 9 is a block diagram illustrating an example of a configuration of a radio communication device according to an altered example of an embodiment.

For example, in the case that the phase of the coefficient (S21) of transmission from the antenna ANT2 to the antenna ANT1 is taken into consideration, it is preferable to include the configuration which is illustrated in FIG. 9 in the control unit 31 when the configuration (the third embodiment) illustrated in FIG. 6 is used as a base. In an example of a configuration illustrated in FIG. 9, an adder 35, a power measuring unit 36 and a phase detection unit 37 are included in the control unit 31.

In the example illustrated in FIG. 9, the adder 35 adds a transmit signal of a radio frequency fT sent from the transmit signal processing unit 20 and a signal component (that is, a signal component extracted using the duplexer 51) of a transmit frequency fT which is extracted from a receive signal received using the reception system of the antenna ANT1 to generate an addition signal. The power measuring unit 36 measures a power value P36 of the addition signal from the adder. The phase detection unit 37 calculates a difference in phase between the transmit signal from the transmit signal processing unit 20 and the signal which is extracted using duplexer 51 on the basis of the input power values (P61, P62 and P36).

Incidentally, the principle of calculation of a phase difference is as follows. That is, assuming that the transmit signal from the transmit signal processing unit 20 is A, the signal extracted using the duplexer 51 is B, and the signal added using the adder 35 is A+B, a square value of the absolute value of each signal level (voltage) may be regarded as a power. Thus, the phase detection unit 37 calculates square values ($|A|^2$, $|B|^2$, $|A+B|^2$) of respective signals and calculates the phase difference θ from the obtained squire values ($|A+B|^2 - (|A|^2+|B|^2) = 2\mathrm{Re}[AB^*] = 2|A||B|e^{j\theta}$).

The same thing also applies in the case that the phase of the reflection coefficient (S11) of the antenna ANT2 is considered.

(5) Fifth Embodiment

Next, an example of a configuration of a radio communication device according to a fifth embodiment will be described.

The configurations which have been described in relation to the first to fourth embodiments are the same as one another in that the variable inductance circuit 40 is included as an object to be controlled using the control unit. On the other hand, in the fifth embodiment, the control unit is configured to control such that both the inter-antenna coupling amount and the inter-antenna correlation coefficient may have as favorable values as possible. Under the circumstances, an object to be controlled is not one of the coupling amount and the correlation coefficient and is an index value (which will be described later) which is calculated by weighting each of the coupling amount and the correlation coefficient.

The configuration of the radio communication device according to the fifth embodiment is the same as the configurations, for example, illustrated in FIG. 6 and FIG. 8 and is different from them in the contents of control to be executed.

Figure 10:
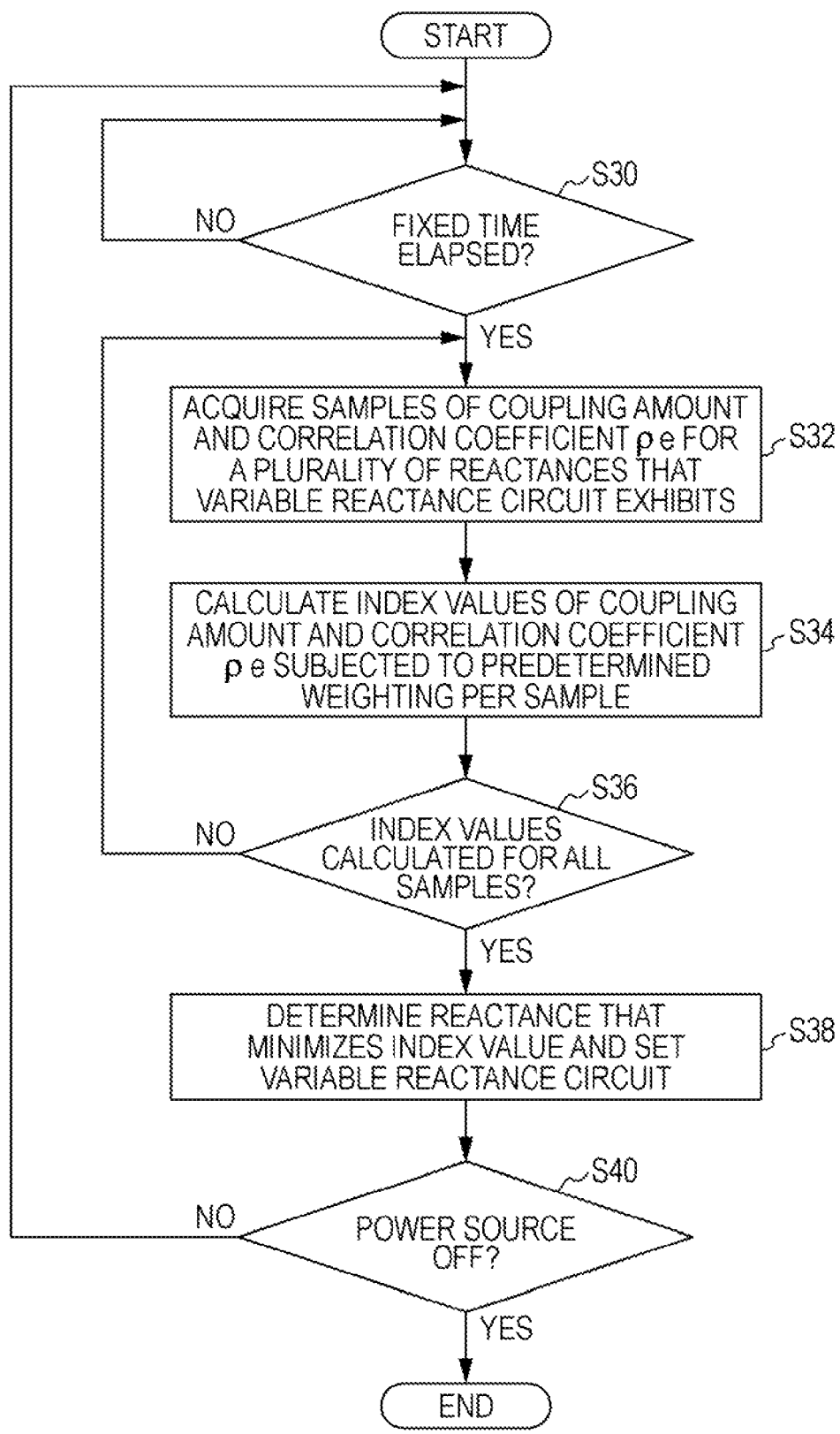
FIG. 10 is a diagram illustrating an example of a flowchart indicating the contents of control executed using a radio communication device according to a fifth embodiment.

Next, an example of the contents of control to be executed using the above mentioned radio communication device will be described with reference to FIG. 10 on the basis of the configuration of the radio communication device illustrated in FIG. 6 by way of example. FIG. 10 is a diagram illustrating an example of a flowchart indicating the contents of the control to be executed using the above mentioned radio communication device. Processes of the flowchart are executed mainly using the control unit 31 illustrated in FIG. 6.

In the flowchart, substantially, the processes at steps S32 to S38 are repetitively executed at fixed time intervals until the power source of the radio communication device is turned OFF (step S40). That is, when a fixed time has elapsed from execution of the previous control (YES at step S30), the processes at step S32 and succeeding steps are again executed. First, the control unit 31 acquires samples of the coupling amount and the correlation coefficient ρe respectively for a plurality of reactances that the variable reactance circuit 40 may exhibit, that is, for reactances within an adjustable range (step S32).

In the example of the configuration illustrated in FIG. 6, the inter-antenna coupling amount corresponds to the power value P61 which is sent from the power measuring unit 61. In the example of the configuration illustrated in FIG. 7, the inter-antenna correlation coefficient ρe is calculated on the basis of the power values P61, P62 and P72 as described above. For example, in the case that the variable reactance circuit 40 is configured as illustrated in FIG. 2A, the control unit 31 calculates the inter-antenna coupling amount and the inter-antenna correlation coefficient ρe for each of a plurality of capacitances that the variable capacitor VC 42 may exhibit and acquires a plurality of samples of each of the inter-antenna coupling amount and the inter-antenna correlation coefficient ρe.

Every tine each sample of each of the inter-antenna coupling amount and the inter-antenna correlation coefficient ρe is acquired, an index value which is obtained by performing predetermined weighting on each of the inter-antenna coupling amount and the inter-antenna correlation coefficient ρe is calculated (step S34). For example, if weighting that the inter-antenna coupling amount: the inter-antenna correlation coefficient=7:3 is defined in advance, each index value will be expressed as the sum of the inter-antenna coupling amount× 0.7 and the inter-antenna correlation coefficient×0.3 for each sample.

When the index values have been calculated for all the samples, the process proceeds to step S38 (step S36).

At step S38, the control unit 31 determines a reactance (in the example in FIG. 2A, a capacitance of the variable capacitor VC42) at which the index value is minimized in the index values of the plurality of samples which have been calculated at step S34. Then, the control unit 31 sets the variable reactance circuit 40 such that the determined reactance may be obtained. The reactance so determined is maintained until the next control is started.

Incidentally, in the example of the flowchart illustrated in FIG. 10, it is preferable that a time interval at which the control is executed (the fixed time at step S30) be short enough to immediately cope with a change in environment in which the radio communication device is used.

As described above, according to the above mentioned radio communication device, the control is executed on the basis of the index values which are calculated by weighting each of the inter-antenna coupling amount and the inter-antenna correlation coefficient, so that the inter-antenna coupling amount and the inter-antenna correlation coefficient have the smallest possible values. In addition, if setting of a value of weighting is made variable, appropriate control conforming to the requirements (for example, the requirements as to whether importance is attached to the coupling performance or the correlation performance) to the radio communication device may become possible.

The examples of the various embodiments of the present art have been described in detail. However, it is obvious that the radio communication device and the signal processing method of the present art are not limited to the above mentioned embodiments and may be varied and modified in a variety of ways without departing from the gist of the present art. For example, in the description of the above mentioned respective embodiments, simple examples of the contents of the control to be executed (FIG. 3, FIG. 7 and FIG. 10) have been presented. However, the present art is not limited to the above and various adaptive algorithms may be applicable.

As mentioned above, the present art has been specifically described for better understanding of the embodiments thereof and the above description does not limit other aspects of the art. Therefore, the present art can be altered and modified in a variety of ways without departing from the gist and scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A radio communication device for executing a communication on the basis of a frequency division duplex, the radio communication device comprising:
   a first antenna;
   a second antenna;
   a first receiver configured to receive a first radio frequency signal via the first antenna;
   a second receiver configured to receive the first radio frequency signal via the second antenna;
   a transmitter configured to transmit a second radio frequency signal via the second antenna;
   a duplexer coupled to the first antenna and the first receiver, and configured to pass a component of the first radio frequency signal in a received signal received via the first antenna to the first receiver and to extract a component of the second radio frequency signal in the received signal;
   a power measuring circuit coupled to the duplexer and configured to measure a first power of the component of the second radio frequency signal; and
   a controller configured to control a variable reactance between the first antenna and the second antenna so as to lower an amount of coupling between the first antenna and the second antenna on the basis of the measured first power.

2. The radio communication device of claim 1, further comprising:
   a second power measuring circuit configured to measure a second power of a sending signal of the second antenna.

3. The radio communication device of claim 2, wherein the controller is configured to control the variable reactance on the basis of the measured first power and the measured second power.

4. A method of controlling a radio communication device for executing a communication on the basis of a frequency division duplex, the method comprising:
   receiving, by a first receiver of the radio communication device, a first radio frequency signal via a first antenna;
   receiving, by a second receiver of the radio communication device, the first radio frequency signal via a second antenna;
   transmitting a second radio frequency signal via the second antenna;
   processing a received signal received via the first antenna, by a duplexer coupled to the first antenna and the first receiver, to pass a component of the first radio frequency signal in the received signal to the first receiver and to extract a component of the second radio frequency signal in the received signal;

measuring, by a power measuring circuit coupled to the duplexer, a first power of the component of the second radio frequency signal; and controlling, with a controller, a variable reactance between the first antenna and the second antenna so as to lower an amount of coupling between the first antenna and the second antenna on the basis of the measured first power.

5. The radio communication device of claim 1, further comprising:
a variable reactance circuit coupled to the first antenna and the second antenna, wherein
the controller is configured to:
calculate at least one of a coupling amount and a coefficient of correlation between the first antenna and the second antenna on the basis of the measured first power, and
adaptively control the variable reactance circuit at fixed time intervals, so as to lower the at least one of the coupling amount and the coefficient.

6. The radio communication device of claim 2, further comprising:
a third power measuring circuit configured to measure a third power of a reflection signal from the second antenna.

7. The radio communication device of claim 6, wherein
the controller is configured to control the reactance on the basis of the measured first power, the measured second power and the measured third power.

8. The radio communication device of claim 6, further comprising:
a local oscillator configured to generate a first radio signal of the second radio frequency signal to the first antenna;
a fourth power measuring circuit configured to measure a fourth power of the first radio signal; and
a fifth power measuring circuit configured to measure a fifth power of a reflection component from the first antenna to the first radio signal.

9. The radio communication device of claim 8, wherein
the controller is configured to control the variable reactance on the basis of the measured first power, the measured second power, the measured third power, the measured fourth power, and the measured fifth power.

10. The method of claim 4, further comprising:
calculating, with the controller, at least one of a coupling amount and a coefficient of correlation between the first antenna and the second antenna on the basis of the measured first power, wherein
the controlling includes adaptively controlling, at fixed time intervals, the variable reactance so as to lower the at least one of the coupling amount and the coefficient.

11. The method of claim 4, further comprising:
measuring, with a second measuring circuit, a second power of a sending signal of the second antenna.

12. The method of claim 11, wherein
the controlling controls the variable reactance on the basis of the measured first power and the measured second power.

13. The method of claim 11, further comprising:
measuring, with a third measuring circuit, a third power of a reflection signal from the second antenna.

14. The method of claim 13, wherein
the controlling controls the reactance on the basis of the measured first power, the measured second power and the measured third power.

15. The method of claim 13, further comprising:
generating, with a local oscillator, a first radio signal of the second radio frequency signal to the first antenna; and
measuring, with a fourth measuring circuit, a fourth power of the first radio signal and a fifth power of a reflection component from the first antenna to the first radio signal.

16. The method of claim 15, wherein
the controlling controls the reactance on the basis of the measured first power, the measured second power, the measured third power, the measured fourth power, and the measured fifth power.

* * * * *